(12) United States Patent
Bailey

(10) Patent No.: US 7,167,159 B2
(45) Date of Patent: Jan. 23, 2007

(54) JOYSTICK COVER

(75) Inventor: Jason Bailey, Houston, TX (US)

(73) Assignee: Geltabz, Inc., Katy, TX (US)

( * ) Notice: Subject to any disclaimer, the term of this patent is extended or adjusted under 35 U.S.C. 154(b) by 0 days.

(21) Appl. No.: 11/172,709

(22) Filed: Jul. 1, 2005

(65) Prior Publication Data

US 2006/0003840 A1  Jan. 5, 2006

Related U.S. Application Data

(60) Provisional application No. 60/584,667, filed on Jul. 1, 2004.

(51) Int. Cl.
G09G 5/08 (2006.01)

(52) U.S. Cl. .................. 345/161; 463/38

(58) Field of Classification Search ........ 345/160, 345/161; 463/36, 38, 47; 273/148 B
See application file for complete search history.

(56) References Cited

U.S. PATENT DOCUMENTS

| 5,667,319 | A | 9/1997 | Satloff |
| 5,813,777 | A | 9/1998 | Bonnstauffer |
| 6,379,061 | B1 | 4/2002 | Liao |
| 6,394,906 | B1 | 5/2002 | Ogata |
| 6,459,420 | B1 | 10/2002 | Harris |
| 2002/0019259 | A1 | 2/2002 | Armstrong |
| 2003/0083131 | A1 | 5/2003 | Armstrong |
| 2003/0123917 | A1 | 7/2003 | Willat et al. |
| 2003/0206154 | A1* | 11/2003 | Hill et al. .............. 345/168 |
| 2003/0234767 | A1* | 12/2003 | Kanaya .................. 345/168 |

FOREIGN PATENT DOCUMENTS

JP  2000-306448 A  * 11/2000

* cited by examiner

Primary Examiner—Jimmy H. Nguyen
(74) Attorney, Agent, or Firm—Bracewell & Giuliani LLP

(57) ABSTRACT

A covering attachment or joystick cover for attaching to a joystick of a game actuation device includes a cover body having a top layer and sides extending downward therefrom. The sides are adapted to surround an upper portion of the joystick. The cover body includes an opening formed between the sides to receive the upper portion of the joystick. The sides of the cover body have a portion extending radially inward in order to attach the cover body to the joystick. The cover body has a first hardness. The joystick cover includes a cover cap positioned over the top layer of the cover body that engages the cover body sides, and has a second hardness that is greater than the first hardness. The joystick cover can also include an image plate that is positioned between the cover cap and the cover body that is visible through the cover cap.

17 Claims, 2 Drawing Sheets

JOYSTICK COVER

RELATED APPLICATIONS

Applicant claims priority to the application described herein through a United States provisional patent application titled "Joystick Cover," having U.S. patent application Ser. No. 60/584,667, which was filed on Jul. 1, 2004, and which is incorporated herein by reference in its entirety.

BACKGROUND OF INVENTION

1. Field of the Invention

The present invention relates generally to game actuation devices, and more specifically to a joystick cover for joysticks on game actuation devices.

2. Background of the Invention

Video, computer, and arcade games continue to remain popular. Several of the games continue to require the player or operator to use at least one depressible button and a joystick to control various aspects of the games. Especially through the development of the at-home computer and video game systems, hand-held controllers are frequently used for the operator to control the action.

Various controllers or game actuation devices have been developed through the years, but most still have at least one depressible button and a joystick. Several game actuation devices include a plurality of depressible buttons and one or more joysticks. Joysticks on recent game actuation devices are mushroom-shaped, with a thin portion extending up from a base of the game actuation device, and wider top portion for engagement by a thumb or finger. The joystick operator typically uses the joystick to control movement during the game for positioning to accomplish a goal or to avoid a dangerous threat. Therefore, good, sustained, comfortable contact with the joystick is essential to the success of the operator during the game.

SUMMARY OF THE INVENTION

A game actuation device includes a handle base with a depressible button and a tiltable joystick. The joystick extends upward from the handle base and includes a rod portion with a first diameter and a top portion with a second diameter. The second diameter of the top portion of the joystick is larger than the first diameter. The game actuation device also includes a removable elastomeric cover body having a top layer and sides extending downward therefrom. The cover body also has an opening formed between the sides to receive the top portion of the joystick. The cover body has a first hardness. The game actuation device further includes an elastomeric cover cap that is positioned over the top layer of the cover body. The cover cap engages the cover body sides. The cover cap has a second hardness that is greater than the first hardness.

The present invention also provides a covering attachment for a game actuation device. The covering attachment includes an elastomeric cover body having a top layer and sides extending downward therefrom. The cover body has an opening formed between the sides to receive a portion of the game actuation device. The covering attachment also includes a cover cap positioned over the top layer of the cover body that engages the cover body sides. The cover cap has at least a substantially transparent portion. The cover cap has an upper slip-resistant surface. The covering attachment further includes an image plate positioned between the cover body and the cover body. The image plate has a predetermined image located thereon that is visible through the substantially transparent portion of the cover cap.

The present invention further provides a joystick cover to be attached to a joystick of a game actuation device. The joystick cover includes an elastomeric cover body. The elastomeric cover body has a top layer and sides extending downward therefrom. The sides are adapted to surround an upper portion of the joystick. The cover body has an opening formed between the sides to receive the upper portion of the joystick. The sides of the cover body having a portion that extends radially inward in order to attach the cover body to the joystick. The elastomeric cover body having a first hardness. The joystick cover also has an elastomeric cover cap positioned over the top layer of the cover body. The cover cap engages the cover body sides. The cover cap has a second hardness that is greater than the first hardness.

DETAILED DESCRIPTION OF THE PREFERRED EMBODIMENTS

Figure 1:
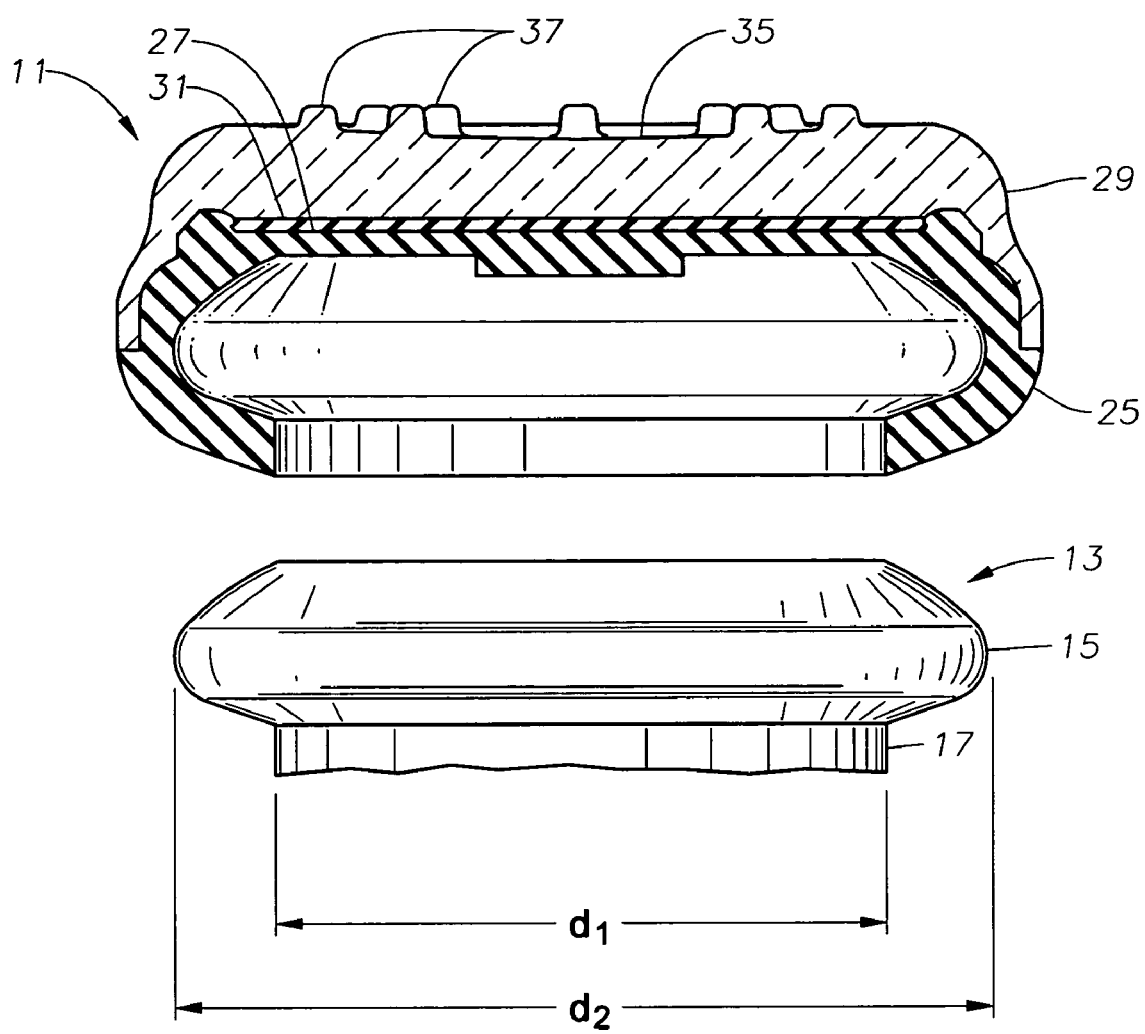
FIG. 1, is perspective view of an upper portion of a joystick and a sectional view of a covering attachment constructed in accordance with the present invention.

Referring to FIG. 1, a covering attachment or joystick cover 11 is shown adjacent a joystick 13. In the preferred embodiment, joystick 13 comprises a top portion 15 and a rod portion 17. Rod portion 17 typically extends axially away from top portion 15 to a remaining portion of game actuation device 19 (FIG. 3).

Figure 3:
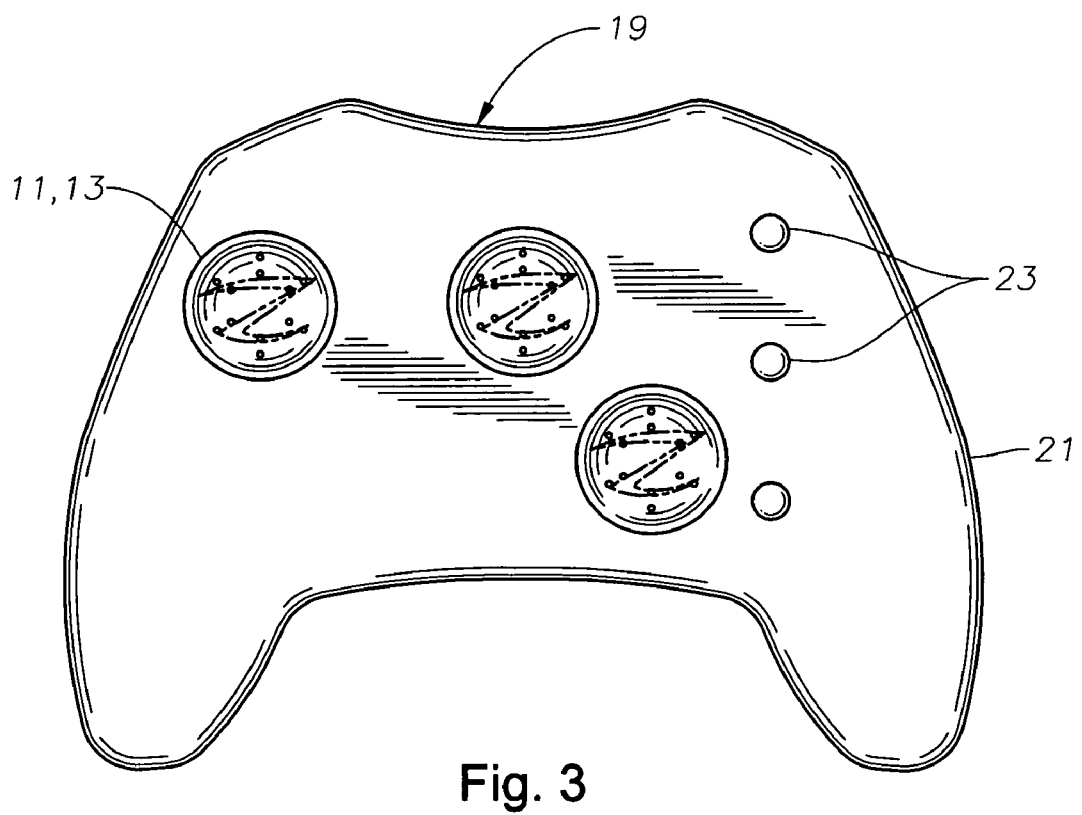
FIG. 3 is top plan view of a game actuation device with a plurality of the covering attachments shown in FIG. 1 attached to joysticks of the game actuation device.

Referring to FIG. 3, game actuation device 19 comprises joystick 13 extending upward from a handle base 21. Preferably, game actuation device 19 also comprises at least one depressible button 23 positioned on handle base 21. As will be readily understood by those skilled in the art, when an operator moves joystick 13 or depresses depressible buttons 23, predetermined reactions occur on a video game to which game actuation device 19 is communicating with.

Referring back to FIG. 1, joy stick cover 11 preferably comprises a cover body 25 formed of a first elastic material. The first elastic material of cover body 25 preferably has a Shore hardness in the range of 1 to 9 on the A scale. In the preferred embodiment, cover body 25 is made with Versaflex® CL2000X, which has an A scale Shore hardness of 3. The elasticity in cover body 25 within the range provided, advantageously allows joy stick cover 11 to attach to joystick 13 in a manner such that joystick cover 11 does not easily slide off of joystick 13. In the preferred embodiment, rod portion 17 of joystick 13 preferably has a first diameter labeled $d_1$ in FIG. 1 and top portion 15 has a second diameter labeled $d_2$. First diameter $d_1$ of rod portion 17 is preferably smaller than second diameter $d_2$ of top portion 15. Cover body 25 preferably includes a top portion with a plurality of sides extending downward therefrom for covering and surrounding the outer circumferences of top portion 15 of joystick 13. Cover body 25 also preferably includes portions extending radially inward from the sides of cover body 25 that extend radially inward toward rod portion 17 after the sides of cover body 25 extend axially beyond top portion 17 of joystick 13. Cover body 25 also preferably includes a recess 27 formed on the upper surface of cover body 25.

Joystick cover 11 preferably also comprises a cover cap 29 formed of a second elastomeric material. The second elastomeric material of cover cap 29 preferably has a Shore hardness in the range of 25 to 50 on the A scale. In one preferred embodiment, cover cap 29 is made from Versaflex® CL30, which has an A scale Shore hardness of 30, and in another cover cap 29 is made from Versaflex® CL40 with an A scale Shore hardness of 43. The hardness range associated with cover cap 29 advantageously provides a soft, gel-like material for engagement by the operator that is operating game actuation device 19, while the first elastomeric material of cover body 25 advantageously provides a stiffness able to keep joystick cover 11 attached to joystick 13 during normal operations.

In the preferred embodiment, cover cap 29 preferably includes side portions extending axially downward from a main body that engage an upper portion of cover body 25. When cover cap 29 is connected to cover body 25, recess 27 is defined between a lower surface of cover cap 29, an upper surface of cover body 25, and peripheral edges of cover body 25. In the preferred embodiment, an image plate 31 is positioned or located within recess 27 prior to cover cap 29 being attached to cover body 25.

Figure 2:
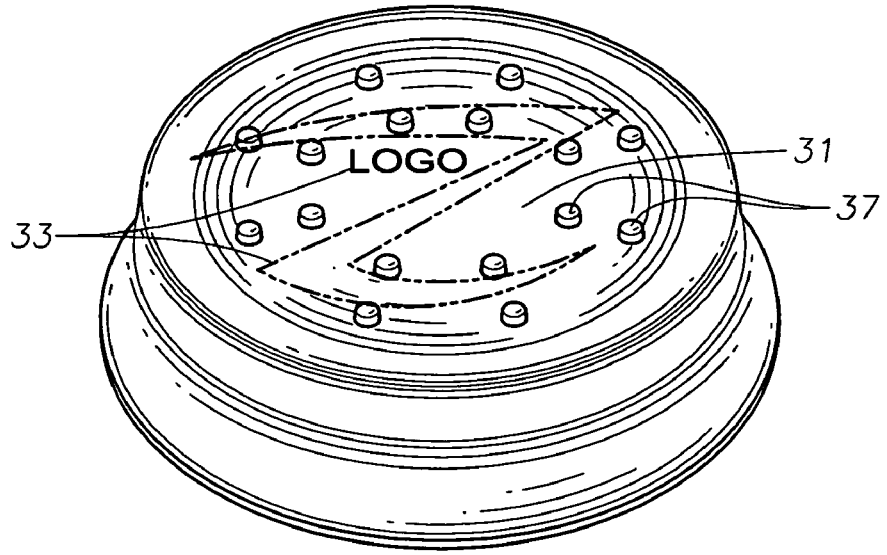
FIG. 2 is a perspective view of the covering attachment shown in FIG. 1.

The second elastomeric material of cover cap 29 preferably comprises at least a portion of which that is transparent so that image plate 31 can be seen through cover cap 29 when cover cap 29 is connected to cover body 25. Referring to FIG. 2, image plate 31 preferably includes an image or a design 33. Image or design 33 shown in FIG. 2 includes a logo or art work that is visible through cover cap 29. As shown in FIG. 2, image 33 includes a logo in typeface text and a design, as shown being an artistic Z. As will be readily appreciated by those skilled in the art, image or design 33 can advantageously include advertising such as logos or characters associated with various games, or color codings which may be used to decorate game actuation devices 19 according to various preferences of operators. Those skilled in the art will readily appreciate that image plate 31 can advantageously be provided with images 33 that can be personalized pursuant to predetermined criteria of an operator or of a manufacturer.

Referring to FIGS. 1 and 2, cover cap 29 preferably includes a slip resistant portion on its upper surface 35. As best shown in FIG. 2, in the preferred embodiment, upper surface 35 preferably includes a concave portion formed in cover cap 29 for a finger of an operator operating joystick 13. Also in the preferred embodiment, upper surface 35 includes a plurality of protrusions 37 formed thereon. As best shown in FIG. 2, protrusions 37 are preferably situated in an array or pattern formed on upper surface 35. The array or pattern of protrusions 37 formed on upper surface 35 of cover cap 29 shown in FIG. 2 includes a plurality of protrusions formed along an outer periphery of upper surface 35. As will be readily appreciated by those skilled in the art, an inner array or segment of protrusions can be formed radially inward of the protrusions formed along the outer periphery of upper surface 35 of cover cap 29. The concave shape of upper surface 35 and the array of protrusions 37 formed on upper surface 35 advantageously provide a slip resistant surface for engagement by a finger or thumb of an operator using game actuation device 19 having joystick cover 11 attached thereto.

While the invention has been shown in only one of its forms, it should be apparent to those skilled in the art that it is not so limited, but is susceptible to various changes without departing from the scope of the invention. For example, cover body 25 could also comprise a material having an A scale Shore hardness up to 10 or 15 so long as there is a difference between the Shore hardness between cover body 25 and cover cap 29. As a further example, the pattern or array of protusions 37 can include a variety of patterns and placement of the protrusions in predetermined locations on upper surface 35 of cover cap 29.

The invention claimed is:

1. A game actuation device for use with an electronic game, comprising:
    a base having a depressible button and at least one handle adapted to be received within a hand of an operator when the operator is playing the game;
    a mushroom-shaped joystick having a rod portion with a first diameter extending upward from the base, and a top portion for engagement by the operator to actuate the joystick, the top portion having a second diameter that is greater than the first diameter; and
    a detachable covering attachment positioned on the joystick, the covering attachment being positioned to convey input from the operator to the top portion of the joystick when the operator is playing the game, the covering attachment comprising:
        an elastomeric cover body having a top layer, sides extending downward therefrom, and an opening formed between the sides to receive the top portion of the joystick;
        a cover cap positioned over the top layer of the cover body, the cover cap engaging the cover body sides and having at least a substantially transparent portion, the cover cap having an upper slip-resistant surface; and
        an image plate positioned between the cover body and the cover cap, the image plate having a predetermined image located thereon that is visible through the substantially transparent portion of the cover cap.

2. The game actuation device of claim 1, further comprising a recess formed in the elastomeric cover body, the recess being formed in the top layer and located opposite the opening.

3. The game actuation device of claim 2, wherein the image plate is located in the recess.

4. The game actuation device of claim 1, wherein the slip-resistant surface comprises a concave portion of the upper surface of the cover cap.

5. The game actuation device of claim 1, wherein the slip-resistant surface comprises a plurality of upwardly extending protrusions.

6. The game actuation device of claim 1, wherein the slip-resistant surface comprises an array of upwardly extending protrusions that are spaced-apart in predetermined locations.

7. The game actuation device of claim 1, wherein the slip-resistant surface comprises a concave portion of the upper surface of the cover cap and a plurality of upwardly extending protrusions having at least some of the plurality of protrusions being spaced-apart in predetermined locations along a periphery of the concave portion.

8. The game actuation device of claim 1, wherein the cover body has an A scale Shore hardness that is less than an A scale Shore hardness of the cover cap.

9. The game actuation device of claim 1, wherein the cover body has an A scale Shore hardness in the range of about 1–9, and the cover cap has an A scale Shore hardness in the range of about 25–50.

10. A detachable joystick cover to be attached to a joystick of a game actuation device, comprising:

an elastomeric and resilient cover body having a top layer, sides extending downward therefrom that are adapted to surround an upper portion of a joystick, and an opening formed between the sides to receive the upper portion of the joystick, the sides of the cover body having a portion that extends radially inward in order to attach the cover body to the joystick, the elastomeric cover body having a first hardness;

an elastomeric and resilient cover cap positioned over the top layer of the cover body, the cover cap engaging the cover body sides, having a second hardness that is greater than the first hardness and comprising at least a substantially transparent portion; and an image plate positioned between the cover body and the cover cap, the image plate having a predetermined image located thereon that is visible through the substantially transparent portion of the cover cap.

11. The joystick cover of claim 10, further comprising:

a recess formed in the elastomeric cover body, the recess being formed in the top layer and located opposite the opening; wherein said image plate is positioned in the recess.

12. The joystick cover of claim 10, wherein the cover cap comprises a concave portion of an upper surface of the cover cap and a plurality of protrusions having at least some of the plurality of protrusions being spaced-apart in predetermined locations along a periphery of the concave portion.

13. The joystick cover of claim 10, wherein the cover body has an A scale Shore hardness that is less than an A scale Shore hardness of the cover cap.

14. A game actuation device for use with an electronic game, comprising:

a handle base with a depressible button and a tiltable joystick, the joystick extending upward from the handle base and includes a rod portion with a first diameter and a top portion with a second diameter that is larger than the first diameter;

a removable elastomeric cover body having a top layer, sides extending downward therefrom, and an opening formed between the sides to receive the top portion of the joystick, the cover body having a first hardness;

an elastomeric cover cap that is positioned over the top layer of the cover body and that engages the cover body sides, the cover cap having a second hardness that is greater than the first hardness and comprising at least a substantially transparent portion; and an image plate positioned between the cover body and the cover cap, the image plate having a predetermined image located thereon that is visible through the substantially transparent portion of the cover cap.

15. The game actuation device of claim 14, wherein an upper slip-resistant surface comprises a concave portion of an upper surface of the cover cap and a plurality of protrusions having at least some of the plurality of protrusions being spaced-apart in predetermined locations along a periphery of the concave portion.

16. The game actuation device of claim 14, further comprising:

a recess formed in the elastomeric cover body, the recess being formed in the top layer and located opposite the opening; wherein said image plate is positioned in the recess.

17. The game actuation device of claim 14, wherein the sides of the cover body extend downward beyond the top portion of the joystick and at least a portion of the sides of the cover body extend radially inward toward the rod portion of the joystick.

* * * * *